INVENTORS
FREDERIC D. BRADDON
VICTOR VACQUIER
BY
ATTORNEY.

Nov. 5, 1957  F. D. BRADDON ET AL  2,811,785
GYROSCOPIC DIRECTION-INDICATING INSTRUMENTS
Filed April 2, 1946  3 Sheets-Sheet 2

INVENTORS
FREDERICK D. BRADDON
VICTOR VACQUIER
BY
Herbert P. Thompson
ATTORNEY.

Nov. 5, 1957  F. D. BRADDON ET AL  2,811,785
GYROSCOPIC DIRECTION-INDICATING INSTRUMENTS
Filed April 2, 1946  3 Sheets-Sheet 3
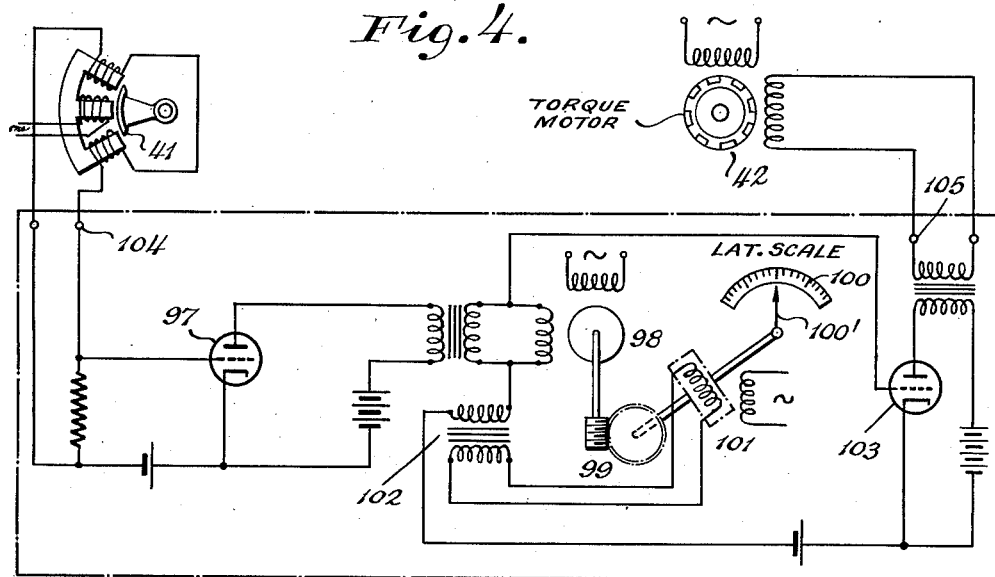
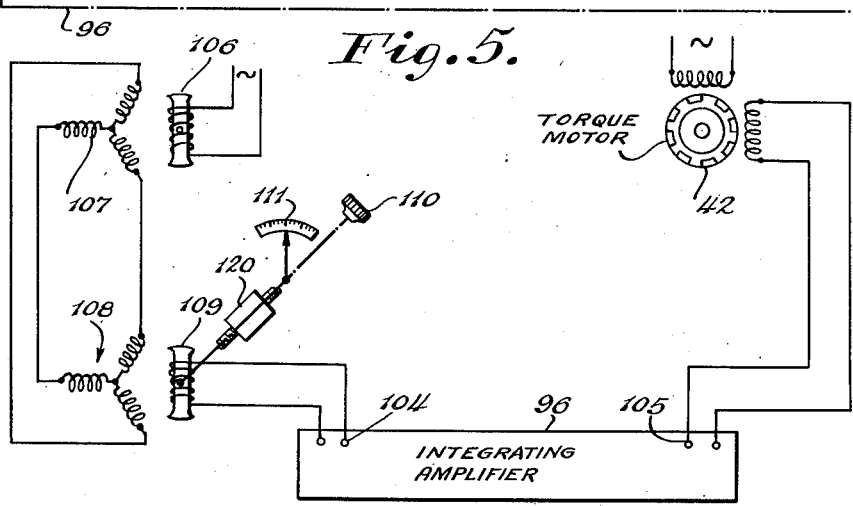
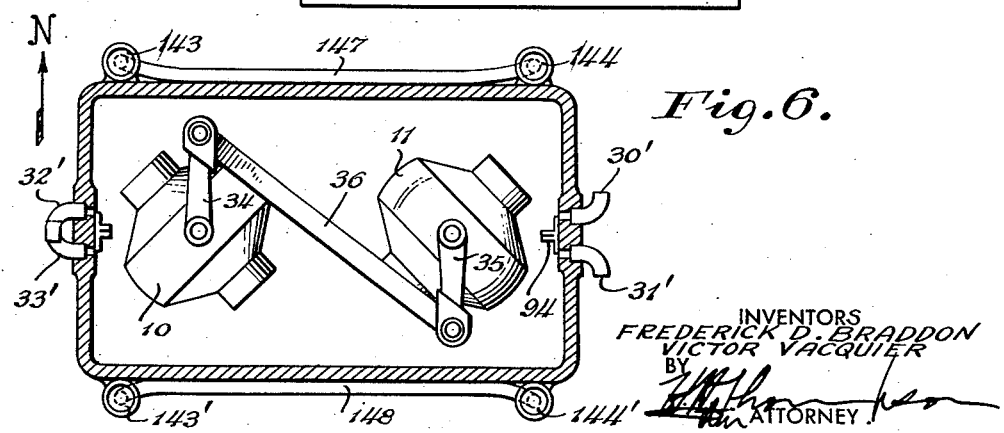
INVENTORS
FREDERICK D. BRADDON
VICTOR VACQUIER
BY
ATTORNEY

United States Patent Office

2,811,785
Patented Nov. 5, 1957

2,811,785

GYROSCOPIC DIRECTION-INDICATING INSTRUMENTS

Frederick D. Braddon, Babylon, and Victor Vacquier, Garden City, N. Y., assignors to Sperry Rand Corporation, a corporation of Delaware Application April 2, 1946, Serial No. 658,902

11 Claims. (Cl. 33—204)

This invention relates to gyroscopic direction-indicating instruments, for affording, on moving craft, references or base lines as to heading in azimuth and as to the vertical or horizontal. Upon ships and aircraft and other mobile vehicles, the problem of determining a stable level plane and of fixing the direction of a reference line in that plane, such as a north-south line for example, is a difficult and important one. These references are needed for steering and navigation and for gunfire control, among other purposes, and they must be maintained stable and accurate despite rolling and pitching and other motion of the craft.

In the past, two or more instruments have usually been used to determine such references; that is, a gyro-vertical to determine the level plane, and a gyro-compass to determine the north-south line. The earth's gravitation and rotation acting on the gyroscopes furnish the motivating phenomena by which these instruments seek the meridian and the vertical. While these instruments have had wide use, the increasingly severe demands for high precision in ordnance equipment can now be met only with great difficulty by addition of refinements to conventional gyro-compasses and verticals.

It is believed that past attempts to achieve an accurate gyro-vertical have largely overlooked the fact that the standard ship's gyro-compass not only furnishes an excellent north-south base line, but also excellent vertical reference about an east-west axis. In other words, the spin axis of the gyro-compass (corrected for the speed-latitude error) not only points north with great accuracy, but also remains level with the same or greater accuracy if a latitude correction is applied. The slight variations both from the north and from level are a function of latitude and are known, so that corrections may be readily applied whereby the true vertical (about the east-west axis) may be maintained at all times. Such an instrument has the advantage that its period may be made, and kept, such that no oscillations are set up by changes of speed or course of the ship, while such oscillations in other types of gyro-verticals are usually set up by such phenomena and have to be slowly damped out. In other words, the modern gyro-compass is so designed that upon a change of speed or course of the ship, it is brought around to a new settling point during such change of speed or course and arrives at the new settling point at the time the ship arrives at such point, such phenomenon being known as ballistic deflection.

According to our invention, we propose to go even further and while retaining all the advantages of the gyro-compass as a meridian-seeking device, we utilize it to indicate accurately the vertical not only about the east-west axis, but also about the north-south axis, for which the present design of gyro-compass is unsuited. By this improved design not only is an accurate vertical obtained in all planes, but the performance of the gyro-compass as a compass is improved. In addition, only one instrument is required as compared to two heretofore.

Our invention is shown as utilizing a gyro-compass of the Anschutz type, wherein two gyroscopes are mounted for precession about vertical axes on a member supported for free angular movement about all axes, and this assembly is made pendulous and is damped in such a manner as to seek the meridian. The stabilization of the sensitive element in the horizontal position is effected by the leveling action about the east-west axis which is inherent in all gyro-compasses, as explained above, and about the north-south axis by greatly increasing the normal period of oscillation, which in most standard compasses is quite short, i. e., on the order of a few seconds. The former leveling action is usually designed to have a natural period of oscillation of about 84 minutes, and it is desirable to have a long natural period of oscillation in the latter case also, if a stable base line is to be obtained about the east-west axis.

According to the present invention, there is provided a heading and vertical reference instrument including a pair of gyroscopes supported in a substantially frictionless manner for precession relative to each other about vertical axes, and for freedom of angular movement in all directions, as a unit, relative to the ship on which the apparatus is mounted. Instability of position of the gyroscopes relative to each other is eliminated by the provision, in lieu of spring constraint, of an electro-magnetic constraint which restores the rotors to a given predetermined angular relation in spite of any changes in rotor speed or other disturbances.

This constraint furnishes the torque required to hold the gyroscopes and prevent them from precessing about their vertical axes to a position where their spin axes would be parallel to each other and to the north-south line. It differs from a spring constraint in that it restores the gyroscopes to a definite relative position even though the torque required to do so varies, as for instance because of change of latitude or rotor speed.

In the instrument of our invention the pendulous restoring moment of the sensitive element can be separately adjusted or controlled about each of the two principal horizontal axes, thereby allowing the desired 84 minute period to be maintained under all conditions.

We incorporate a stabilized housing from which indications of roll and pitch of the craft can be taken, for use in stabilizing guns and gunfire control instruments and other purposes. We thereby make available a unitary gyroscopic instrument by which the vertical as well as the north-south line is determined. In our instrument, a twin-rotor gyro-compass is combined with a directional gyroscope which is stabilized by the compass gyroscopes. We provide for the introduction of latitude and speed correction in the coupling between the gyro-compass sensitive element and the directional gyroscope. In this construction, any irregularities in the course or speed data supplied to the correction computing mechanism are smoothed out by the action of the directional gyroscope. We thereby make use of the latter gyroscope in smoothing out any irregularities in the control forces applied to it, to improve the accuracy and consistency of the heading indication.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In the accompanying drawings there are shown, more or less diagrammatically, two examples of what are at present regarded as the best embodiments of the invention.

In the drawings,

Fig. 4 shows diagrammatically the electrical connections and components of the twin gyroscope interconnection;

Fig. 5 shows an alternative arrangement of electrical connections and components, also in diagrammatic form; and Fig. 6 shows in plan, with some parts shown in section, the alternative form of the invention.

Figure 1:
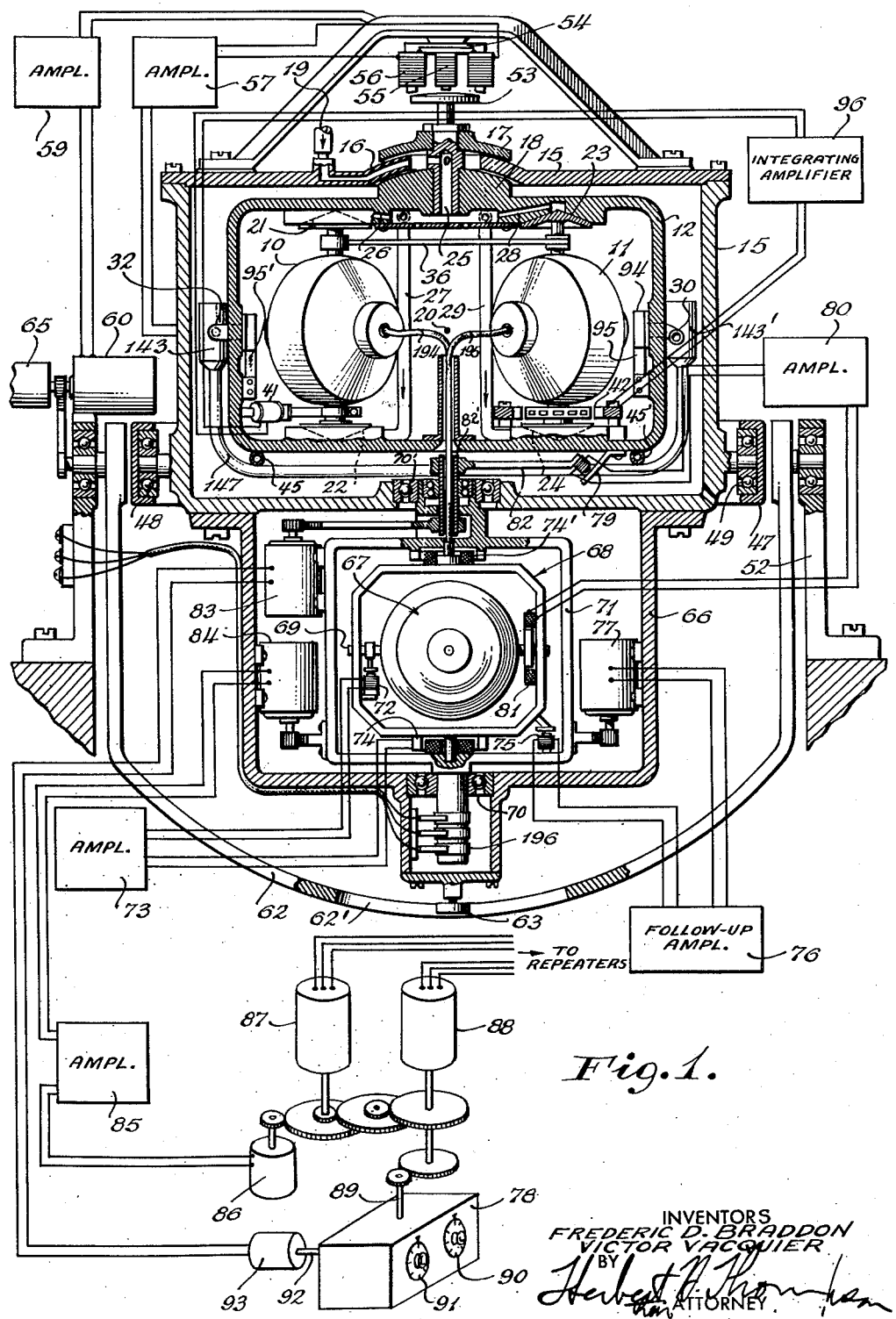
Fig. 1 is a view in elevation of one form of the instrument, as seen from astern when in operation with the ship headed north. Some parts are shown in section and auxiliary equipment is shown diagrammatically.
Figure 2:
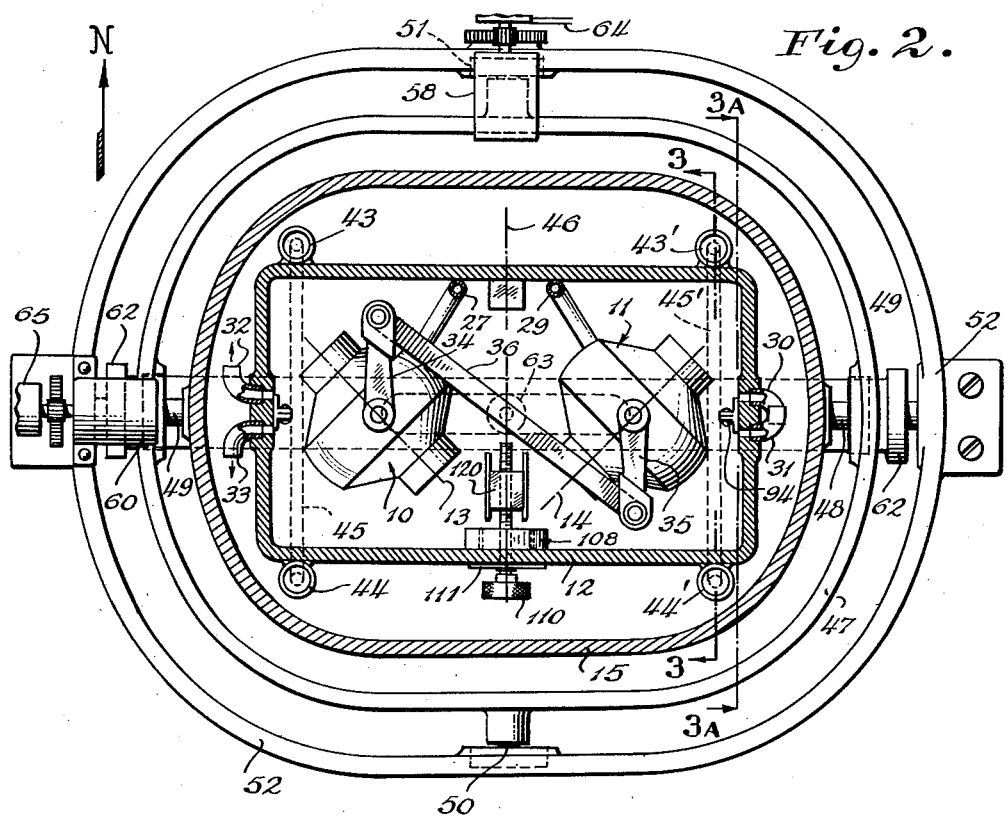
Fig. 2 is a view of the instrument in plan, some parts being shown in section.

Referring to Figs. 1 and 2, the apparatus includes a pair of gyroscope rotor casings 10, 11 which are mounted in a sensitive element or frame 12 for free angular precessional movement about vertical axes, and which contain rotors (not shown) mounted to spin about normally horizontal axes 13 and 14. The frame is supported for free angular movement in any direction with respect to a follow-up housing 15 by means such as a universal air bearing comprising a spherical portion 16 integral with the follow-up housing and two spaced spherical members or cups 17, 18 in rigid relation to frame or case 12. The spacing of members 17, 18 is such that air introduced under pressure through a duct 19 supports these members in a substantially frictionless manner. The effective center of curvature 20 of the air bearing members lies near, but preferably slightly above the center of gravity of the gyroscope and case assembly supported thereby.

In the drawing, the air bearing supports are shown diagrammatically only, as such bearings are now well known [see the prior patent to Braddon (one of the present applicants) 2,295,254—September 8, 1942]. Other gases may be used in place of air to the same purpose. The requirement to be met by any such equivalent design is that the supporting and lubricating fluid be supplied in sufficient volume and velocity so that the solid bearing members do not rub or slide in direct contact with each other, and the mass is literally floated on air so that the resistance to relative movement of the bearing elements is determined only by the viscosity or inter-molecular friction of the supporting and lubricating fluid. Choice of a low viscosity fluid, of which air is a prime example, reduces the bearing friction to an extremely low value. At the low relative speeds involved in this device, the frictional resistance of these preferred bearings is very much lower than that of the best ball bearings or any other known bearings, being almost zero. Other arrangements of the spherical surfaces for a universal air bearing are shown in U. S. Patents 2,263,232, issued November 18, 1941, to William Bolster, and 2,295,254, issued September 8, 1942, to F. D. Braddon.

Figure 3A:
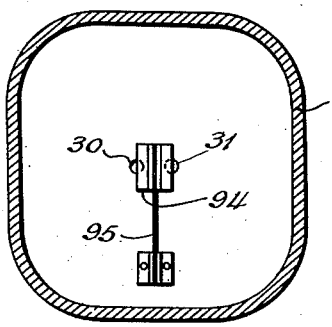
Figs. 3 and 3A are sectional views, the respective planes of section being as indicated by the arrows 3 and 3A in Fig. 2.
Figure 3:
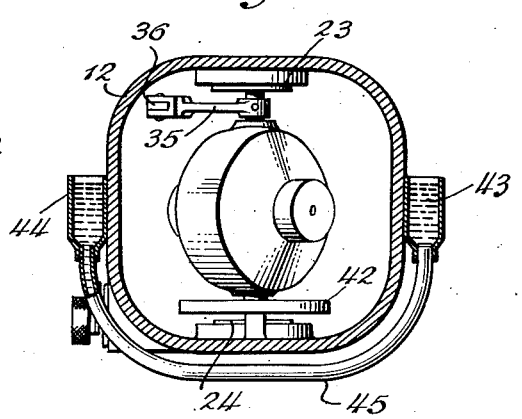

Each rotor casing 10, 11 is supported within the case 12 on a single-axis air bearing, so that it may turn with a minimum of friction about a vertical axis. Cups 21, 22, 23, 24 in case 12, mating with extensions of the gyroscope casings, form these bearings. Air under pressure is supplied to these bearings through passages 19, 25, 26, 27, 28 and 29. The exhaust air escapes from the case 12 through four controlled ports 30, 31, 32 and 33 (Fig. 2). The horizontal exhaust air jets are effective to damp precessional oscillation of the sensitive element, as will be explained later. The two rotor casings are linked together by arms 34 and 35 and link 36 so that they are constrained to move equally but oppositely about their vertical axes. Antifriction bearings are used at the points of connection of arms and links. Fixed to the west rotor casing 10 at its lower portion is a positional signal pick-off 41, and to the east rotor casing is similarly fixed one element of an electrical torque motor 42. The construction, function, and operation of these electrical elements are described hereinafter, in connection with Fig. 4. One or more pairs of interconnected liquid containers 43, 44, 43′, 44′ (see also Fig. 3) of conventional construction are fixed to the case 12 to cause it to turn so that its axis 46 is directed N–S, which construction is often referred to as liquid ballistic. The containers of each pair are connected by a pipe 45, 45′ of restricted cross section. Alternatively, the liquid containers may be omitted and the sensitive element will then rely on its pendulosity to make it north-seeking. In that case the rotation of each gyroscope in casings 10, 11 has an earthwise component instead of the counterearthwise component required when a liquid ballistic is employed, and the direction of the damping torque is reversed by turning jets 30′, 31′, 32′, and 33′ in the opposite direction, as may be seen by a comparison of Figs. 2 and 6.

In this alternative construction, the degree of pendulosity required for precessional control is so great as to shorten undesirably the period of oscillation of the sensitive element about the north-south axis. We have overcome this difficulty by a novel construction (Fig. 6) whereby one or more pairs of interconnected containers 143—144, 143′—144′ of balancing liquid, similar to the conventional liquid ballistic, are mounted on the sensitive element in E–W planes. This balancing liquid reduces the pendulosity of the sensitive element about its north-south axis, without affecting the east-west pendulosity. The period of oscillation of the gyro pendulum about the north-south axis of suspension is thereby made independent of the pendulous moment required for precessional control to make the gyro-compass north-seeking. For this alternative construction of our invention, we connect containers 143 and 144 by tube 147 and containers 143′ and 144′ by tube 148. Said containers also may serve the useful function of damping the oscillations of the compass about the N–S axis.

The housing 15 is supported in a gimbal ring 47 by bearings 48, 49, and the gimbal ring is similarly supported at 50, 51 (Fig. 2) from a binnacle 52 which is fixed to the craft (not shown) in which the apparatus is installed.

Tilting movements of the case 12 relative to housing 15 are detected by a two-axis pick-off which is shown as of the type disclosed in Patent 1,984,874 to R. E. Gillmor, including a discoid iron armature 53 in fixed relation to case 12 and a five-pole stator 54 having a central exciting winding 55 and two pairs of pickup windings (of which only one pair 56 appears in the drawings). Windings 56 are connected to an amplifier 57 controlling a gimbal ring servo motor 58, and the other pair of windings (not shown), to an amplifier 59 controlling a servo motor 60 operating through bail 62. The amplifiers are of a known type adapted to produce an output varying with the sense and amplitude of the displacement of pick-off 53, and upon such displacement to control the servo motors in a sense to reduce the displacement. In operation, these pick-offs and servo systems cause the housing to follow closely the apparent movements of the gyro assembly in roll and pitch. The connection between motor 60 and housing 15 is made through said bail 62, which has a slot 62′ in which a roller 63 carried by housing 15 rolls without appreciable side play. The resultant angles between the stabilized horizontal plane perpendicular to the axis of support of housing 15 and the plane of the craft's deck are thus measured by the rotation of motors 58 and 60 from their initial or zero positions. These angles are transmitted electrically to any desired external repeaters, computers, or stabilizers by means of "selsyn" or other synchro transmitters 64 and 65 geared to the respective motors.

In addition to the compass element above described, we also prefer to incorporate a third gyroscope of the directional type. To this end, a downward extension 66 of stabilized housing 15 carries a directional gyroscope whose rotor case is shown at 67. Within this case the gyro rotor (not shown) spins on an axis which, as will be later explained, is normally horizontal and north-and-south in the vertical plane of axis 46. The case is supported on horizontal bearings in a vertical ring 68 so that it is free to tilt about a horizontal east-west axis 69. The vertical ring is rotatably supported about a vertical axis colinear with the axis of bearings 70—70' in a housing 71, which in turn is mounted in bearings in extension 66 of housing 15 so that it also is free to rotate about the axis of bearings 70—70'.

The spin axis of the directional gyroscope is maintained level by a leveling control of any known type, represented in the preferred embodiment of the invention by a pick-off 72 responsive to angular tilt of the gyroscope case about axis 69 which controls through an amplifier 73, a torquer 74 adapted to exert a torque about the vertical axis of the gyroscope. Follow-up ring 71 is aligned about the vertical axis with vertical ring 68 by means of a conventional follow-up drive comprising pick-off 75, amplifier 76, and servo motor 77.

In addition, the directional gyroscope is directionally controlled from the double gyroscope case 12 so that its spin axis points true north. The double gyroscope assembly, as in previously known gyro-compasses, attains equilibrium at an orientation slightly off the meridian by an amount dependent upon the latitude and the north-south component of ship's speed, generally referred to as the north steaming error or the northerly speed error. Correction for the northerly speed error is included in the slaving electromechanical connections between case 12 and directional gyroscope 67. The required correction is determined by a correction device 78 and introduced as a differential angular movement between the directional gyroscope case 71 and positional pick-off 79, as will be explained hereinafter.

Introducing the northerly speed correction at this point in the system has the advantage that irregularities in speed or course factors set into the correcting mechanism are smoothed out by the integrating action of the directional gyroscope. The directional gyroscope is slaved or constrained to follow the gyro-compass case 12 by pick-off 79, amplifier 80, and torque motor 81. Any departure of the pick-off 79 from its null or zero signal position produces an electrical signal which, after amplification, energizes the torque motor 81 to precess the directional gyroscope toward the null position. One element of the pick-off 79 is fixed to case 12, and the other is carried on arm 82, which is rotatably secured to a sleeve 82' supported about the vertical axis 70—70'. Said sleeve in turn is rotated with ring 71 through a synchro repeater 83 mounted on the housing by which a correction is introduced into the driving connection.

A transmitter synchro 84 is positioned by the rotation of housing 71 relative to housing 15, and serves as the primary source of heading data. By means of an amplifier 85 and servo motor 86 it positions the coarse and fine synchro transmitters 87 and 88 to which may be electrically connected any desired number of compass repeaters (not shown), or other receivers of heading indications. Heading servo motor 86 also drives shaft 89, by which heading is set into speed and latitude corrector 78. This corrector has knobs 90 and 91 for the manual setting in of the speed and latitude factors. From these three quantities it computes in the well-known manner (as shown for instance in Patent 1,403,062 to E. A. Sperry) the correction required because of the northerly component of ship's speed, and its output shaft 92 drives a synchro transmitter 93 which is connected electrically to repeater 83, to introduce the required correction between gyro-compass and directional gyroscope so that the spin axis of the latter points true north.

In operation, the rotors of the three gyroscopes are spun at high speed by conventional means from three-phase electrical power supplied through flexible leads connected through slip rings 196 to leads passing upwardly through sleeve or tube 82' which is normally oriented substantially with the vertical ring. Air is supplied through passage 19. The double gyroscope case 12, freely suspended by the universal air bearing 16 precesses toward the north under the influence of the liquid ballistics 43 and 44. Oscillation about the meridian is damped by the leveling action of air jets 30, 31, 32 and 33, as will now be explained. Flow through the passages 30 and 31 is controlled by valve member 94, which is carried by a flat spring 95 fixed to case 12 (see Figs. 1 and 3A). The flat spring and valve member together form an inverted pendulum, so that as the case 12 departs from the normal level attitude, valve 94 is displaced sideways relative to case 12 and passages 30 and 31, enlarging the entrance to one passage and restricting the other. The resulting change in air flow in the two jets causes a torque to be exerted on case 12 about the vertical axis, in such a direction as to reduce the tilt. A similar action occurs at the west jets 32 and 33 through valve-spring 95' adding to the leveling torque. True compass action is thus secured.

The momentum of gyroscopes 10 and 11 and the anti-pendulous effect of ballistics 43 and 44 are preferably so proportioned as to result in a precessional period of about 84 minutes; this period being an optimum for reasons well understood in the gyro-compass art. The rotational speed of the two gyroscopes is preferably controlled by known means to maintain this 84-minute period in all latitudes.

A comparably long natural period of oscillation of case 12 as a gyro pendulum about its north-south axis of suspension is also desirable, as above explained and is achieved in our invention by means now to be described. As has been stated, the two gyroscope casings are connected together, as by arms 34 and 35 and link 36, and a positional pick-off 41 controls a torque motor 42 to drive them oppositely about their vertical axes to an equilibrium position, which is shown as about 45° from the north-south axis. Swinging of the gyro pendulum about its suspension is resisted by precession of the two gyroscopes away from this equilibrium position. Lengthening the period of oscillation (for a given value of the east-west component of spin momentum) requires a decrease in one or both of two force-displacement ratios. The first such ratio is that of pendulous or other restoring moment to displacement about the north-south axis, the second is that of total restoring torque, including the torque exerted by motor 42, to departure of the gyroscopes from their equilibrium position. The first ratio is reduced as much as possible in the design of the instrument by keeping the center of gravity of the sensitive element close to its virtual point of suspension. The second is reduced by proper design of the electromagnetic restoring system, as will be later explained in detail. In order to allow these two expedients to be effective in producing the desired long period of oscillation, it is essential to attain the optimum freedom of suspension, and this we do by means of the air bearing suspension of the sensitive element and two gyroscopes. Any departure of the two gyroscopes 10 and 11 from their normal position results in generation of a signal in pick-off 41, which is applied to the input terminals 104 of integrating amplifier 96, a preferred embodiment of which is shown in diagrammatic detail in Fig. 4. The signal is amplified in an electron tube 97 and applied to one winding of an eddy current motor 98. The other winding of the motor is energized from the alternating-current power supply, and the motor (similar to conventional watt-hour meters) runs at a speed proportional to the amplified signal voltage. The total displacement of the motor is then proportional to the time integral of the applied voltage or of the magnitude and duration of the error signal from pickoff 41. This displacement is effective through reduction gearing 99 to displace from an initial zero-output position a component resolver 101 of the vario-coupled transformer type. This device is supplied with alternating current from the power supply, and yields a voltage which is determined by the angular relationship of its two coils. In the initial position of the component resolver, its two coils are at right angles and the output voltage is zero. As the movable coil is displaced by the action of motor 98, a voltage proportional to the time integral of the positional error signal is generated in the movable coil and applied to the output transformer 102. The positional error voltage is added to it algebraically and the resultant voltage is further amplified in electron tube 103. The output voltage from the entire amplifier appears on terminals 105 and is applied to torque motor 42 to maintain the gyroscope spin axis at the desired angle to the north-south axis. By this means a weak restoring torque proportional to displacement is applied, and a corrective torque varying with latitude is determined by integration of the positional error and applied to hold the gyroscopes in the desired position, while the effect is smilar to that of a very long flexible spring constraint between each gyroscope and the case 12, in which the springs are automatically adjusted for lattitude, and automatically corrected for all other disturbing factors. But the desired long period of oscillation about the N-S horizontal axis is not obtainable in practice by the use of springs alone because if the springs are made yielding enough to secure the preferred long period in azimuth and about the E-W horizontal axis, the spin axis of the gyroscopes will be left almost unconstrained in azimuth and assume positions where both gyros point substantially north, in which case the stabilizing effect about the horizontal N-S axis would become negligible. In other words, increasing the flexibility of the spring will not give a long period of oscillation about the horizontal N-S axis unless the angles that the gyros are held off the meridian is maintained at a substantial amount by auxiliary means such as applicants' pick-off 41 and torque motor 42. In addition, an accurate adjustment of the spring tension while the gyroscopes are running would be necessary, the solution of which problem is not found in the prior art. With our invention, on the other hand, a fixed angular relationship between the gyro 10 and the meridian is maintained by the use of the pick-off 41, the output of which is applied directly to the torque motor 42. In addition, the output is integrated by the motor 98 and vario-transformer 101, so that an additional factor is applied by the torque motor, which causes the torque to continue to be built up as long as any signal persists from pick-off 41. Therefore, the angle that each gyro 10—11 makes with the meridian, that is, the angle between lines 13 and 46 and between 14 and 46 in Fig. 2 is held substantially constant.

Another important factor contributing to the success of this invention is the use of the air bearings 21, 22, 23 and 24 about the vertical axis of the gyroscopes 10 and 11, which reduces almost to zero the frictional forces which must be overcome by the coercive coupling between the two gyroscopes. With appreciable friction present in these bearings, it becomes practically impossible to obtain the desired long period about the E-W axis. It is interesting to note that the displacement of the vario-transformer 101 is a function of latitude and that therefore, if desired, a latitude scale 100 may be provided for a pointer 100' on the shaft of the transformer.

Amplifier 96 is designed for a gain determined by the displacement-voltage characteristic of pickoff 41 and the current-torque characteristic of the torque motor 42. The gain is made such as to give an overall ratio $K_s$ of restoring torque (of 42) to displacement (of 41) determined from the relation $$T_n = \frac{4\pi H \sin \alpha_0}{\sqrt{KK_s}}$$

where:

$T_n$ is the desired natural period of oscillation,

H is the angular momentum of each of the gyroscopes 10 and 11, $\alpha_0$ is the angle between the spin axis and the north-south axis of symmetry, and K is the ratio of restoring torque (about the N-S axis of symmetry exerted by gravity on case 12 to displacement (about the same axis).

With the double gyroscope case 12 thus constrained to level itself and to direct its axis 45—46 northward, it is followed by the housing 15 and the directional gyroscope 67 through the operation of the follow-up systems already described, and the transmitters 64, 65, 87 and 88 are thereby positioned to send accurate attitude and heading data to any suitable receivers which are electrically connected thereto.

An alternative construction is shown in Fig. 5, in which the pickoff 41 is replaced by a selsyn transmitter so that the position of the gyro casings 10 and 11 can be adjusted with respect to their vertical axes of support. In this way the north-south component of spin momentum of the two gyroscopes can be adjusted to keep the desired 84-minute period of precessional oscillation in all latitudes, without altering the speed of the two gyroscopes, or the pendulous factor.

In this construction the electromagnetic pick-off 41 is replaced by a selsyn 106. The rotor thereof is fixed to gyroscope case 10 and carries a winding which is energized from the alternating-current power supply. The three-part stator winding 107 of the selsyn is carried by casing 12, and is electrically connected to the corresponding stator winding 108 of a selsyn signal generator. This stator is fixed on the craft, and the rotor 109 is positioned manually by knob 110, with reference to a latitude scale 111. A certain angular position of rotor 109 for each latitude value is thereby fixed, and when rotor 106 is in a corresponding angular position, no input signal is applied to the integrating amplifier 96'. Should rotor 106 depart from the angular position desired for a given latitude, an electrical signal proportional to the departure is applied to the input terminals 104 of the amplifier, and torque motor 42 is thereby energized to turn the gyroscope casings 10 and 11 to the desired position, in which the input signal becomes zero. The latitude scale 111 is laid out to position the gyroscopes 10 and 11 so that their northerly component of spin momentum (for a fixed spin speed) will be such as to produce the desired 84-minute precessional period. The period is thereby kept correct in all latitudes without requiring a change of rotor speed.

A further refinement is also shown in this figure and in Fig. 2. It is well understood in the art of gyrocompasses that when the gyro is settled on the meridian, the gyro axle is not truly horizontal except on the equator, but is inclined slightly at an angle which is a function of the sine of the latitude. In order that our improved instrument may be used to give the true vertical about the E-W axis, we prefer, therefore, to provide some means settable with latitude for correcting for this slight inclination so that the gyro will remain truly horizontal in all ordinary latitudes. For this purpose we have shown diagrammatically a movable mass 120 (Figs. 2 and 5) which is shiftable in the N-S direction to slightly alter the balance of the compass about the E-W axis the shifting being shown as effected from the knob 110 which is above described as settable in accordance with specially graduated latitude scale 111. Obviously, such a weight might also be provided in Fig. 4, to be shifted from the shaft of the latitude pointer 100'. In this case, the latitude adjustment would be automatic.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyroscopic reference instrument comprising a housing, means for mounting said housing for angular movement about all axes, including a vertical axis, a pair of gyroscopes mounted for freedom about spaced vertical axes in said housing with their spin axes normally inclined to one another in a horizontal plane, means for coupling said gyroscopes for equal and opposite turning about said vertical axes, a pick-off between the gyro and its housing for generating a signal upon and proportional to the departure of the spin axis of at least one gyroscope from predetermined orientation in said housing, power means actuated by the said signal for applying torque to each gyroscope about its vertical axis in opposite directions to restore said predetermined orientation, and gravity-responsive means for maintaining the housing substantially level and on the meridian.

2. A gyrocsopic reference instrument, as claimed in claim 1, having an adjusting means between said pick-off and said torque means for altering the angle between said two gyroscopes, and means settable in accordance with latitude for adjusting said adjusting means.

3. In a gyro-compass, a sensitive element pendulously mounted about horizontal axes and for freedom about a vertical axis, a pair of gyroscopes with their spin axes normally at a predetermined angle with respect to each other in a horizontal plane, means for mounting the gyroscopes in the sensitive element permitting limited freedom about their vertical axes, means for producing a signal upon a departure of a gyroscope from a predetermined orientation in said element, means for obtaining therefrom the time integral of the departure angle, and means responsive thereto for applying to the gyroscopes torques opposing said departure.

4. A gyroscopic reference instrument for craft comprising a gyro-compass element, a directional gyroscope element, adjustable angular-position-responsive means associated with said elements and adapted to give a signal upon departure of the elements from a given predetermined angular relation, means controlled by said position-responsive means and adapted on occurrence of such signal to urge the directional gyroscope toward the predetermined angular relation, and means operated by orientation of said elements for adjusting the position-responsive means as a function of the craft's heading as indicated by the gyro-compass, whereby the north steaming error of the compass is not transmitted to the directional gyro.

5. A gyroscopic instrument for craft comprising a gyro-compass element, a directional gyroscope, a position-comparing signal generating device responsive to departure of the gyro-compass element and the directional gyroscope from a fixed azimuthal angular relationship, means controlled by said signal to cause precession of the directional gyroscope to restore such relation, and means operated by the gyro-compass to adjust said device so as to alter such relation with changes in heading of the craft, whereby the northerly speed error of the gyro compass element does not reach the directional gyroscope.

6. A gyro-compass comprising a member mounted for angular freedom in any direction, a pair of gyroscopes mounted therein with their spin axes free to precess in a normally horizontal plane, means for measuring the difference between the angle of intersection of their spin axes and a preselected angle, means for applying opposite torques to the gyroscopes in response to said means to alter the difference, and means for changing the magnitude of the preselected angle whereby the period of oscillation of the compass in azimuth may be kept substantially constant in different latitudes.

7. In a gyroscopic compass type instrument, a meridian seeking gyroscopic element, a slave directional gyroscope element adjacent thereto, with its spin axis normally horizontal and in the meridian, a common gimbal support for both elements, a pick-off governed by the relative orientation of said two elements, means for applying torque about a second horizontal axis of the slave gyroscope responsive to the output of said pick-off and means for introducing a northerly speed error correction in the relative position of said pick-off whereby the slave gyroscope always points to true north.

8. A damper for gyroscopic compasses having a rotor casing supported for freedom about the E–W horizontal axis and a vertical axis, comprising a spring-constrained inverted pendulum mounted for displacement in a north-south plane upon tilt of said casing about said E–W axis, and differential air-blast means brought into action by such displacement for applying a torque about said vertical axis in a direction to reduce the tilt.

9. In a gyroscopic universal reference, a gyro compass element, and a directional gyroscope element, a universally mounted common frame for both elements, whereby the latter gyroscope is stabilized about both horizontal axes, means for generating a signal upon departure in azimuth of the directional gyroscope from the north as determined by the gyro compass, torque means controlled by said signal for applying a torque about the horizontal axis of the directional gyroscope, whereby the same is maintained on the meridian and means for transmitting the heading only from said directional gyroscope.

10. In a gyroscopic compass type instrument, a meridian seeking gyroscopic element, a slave directional gyroscope element adjacent thereto, with its spin axis normally horizontal and on the meridian and adapted to actuate a compass card, a common support for both elements having a compass card, a pick-off on the directional gyroscope controlling the orientation of said support, a second pick-off governed by the relative orientation of said two elements, means for applying torque about a second horizontal axis of the slave gyroscope responsive to the output of said pick-off and means for introducing a northerly speed error correction in the output of said pick-off whereby the slave gyroscope and card always show the true north.

11. In a gyroscopic reference instrument, a gyro-compass element of the multi-gyro type, a directional gyroscope element, a common gimbal mounting stabilized thereby about both horizontal axes with like periods of oscillation, means producing a signal responsive to departure of the two elements in azimuth from a predetermined azimuthal angular relation, a speed-latitude correction device for computing the northerly speed error from the heading of the ship indicated by the instrument, means for varying such relation in accordance with the output of said correction device, and means acting on the directional gyroscope, controlled from the signal from the first-named means and operable thereby upon such departure, for maintaining the directional gyroscope on the meridian.

References Cited in the file of this patent

UNITED STATES PATENTS

| | | |
|---|---|---|
| 1,186,339 | Schuler | June 6, 1916 |
| 1,403,062 | Sperry | Jan. 10, 1922 |
| 1,497,660 | Henderson | June 10, 1924 |
| 1,687,970 | Corliss | Oct. 16, 1928 |

(Other references on following page)

UNITED STATES PATENTS

| | | |
|---|---|---|
| 1,773,808 | Davis | Aug. 26, 1930 |
| 1,811,415 | Harris | June 23, 1931 |
| 1,984,874 | Gillmor et al. | Dec. 18, 1934 |
| 2,263,232 | Bolster | Nov. 18, 1941 |
| 2,295,254 | Braddon | Sept. 8, 1942 |
| 2,412,614 | Haskins et al. | Dec. 17, 1946 |

FOREIGN PATENTS

| | | |
|---|---|---|
| 281,307 | Germany | Dec. 31, 1914 |

OTHER REFERENCES

Rawlings: "The Theory of the Gyroscopic Compass," 2nd edition. Published by MacMillan Co., New York, N. Y., March 1944. (See pages 40 and 41.)